US012304080B2

(12) United States Patent
Ahire et al.

(10) Patent No.: US 12,304,080 B2
(45) Date of Patent: *May 20, 2025

(54) METHOD FOR AUTONOMOUSLY REPAIRING SURFACE DEFECTS IN A WORKPIECE THROUGH SURFACE MODIFICATIONS

(71) Applicant: GrayMatter Robotics Inc., Gardena, CA (US)

(72) Inventors: Avadhoot Ahire, Gardena, CA (US); YiWei Chen, Gardena, CA (US); Rishav Guha, Gardena, CA (US); Satyandra K. Gupta, Gardena, CA (US); Ariyan M. Kabir, Gardena, CA (US); Ashish Kulkarni, Gardena, CA (US); Ceasar Navarro, Gardena, CA (US); Sagar Panchal, Gardena, CA (US); Brual C. Shah, Gardena, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,130

(22) Filed: Oct. 11, 2023

(65) Prior Publication Data

US 2024/0033915 A1 Feb. 1, 2024

Related U.S. Application Data

(63) Continuation of application No. 18/142,480, filed on May 2, 2023, now Pat. No. 11,938,632, which is a (Continued)

(51) Int. Cl.
*B25J 9/16* (2006.01)
*B24B 51/00* (2006.01)
(Continued)

(52) U.S. Cl.
CPC ............. *B25J 9/1653* (2013.01); *B24B 51/00* (2013.01); *B25J 9/163* (2013.01); *B25J 9/1664* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS

| | | | | |
|---|---|---|---|---|
| 11,938,632 | B2 * | 3/2024 | Ahire | G06T 1/0014 |
| 2012/0220194 | A1 * | 8/2012 | Maloney | B24B 37/30 451/5 |

(Continued)

*Primary Examiner* — Robert T Nguyen
(74) *Attorney, Agent, or Firm* — Run8 Patent Group, LLC; Peter Miller

(57) ABSTRACT

A method includes: compiling lower-resolution images, captured during a global scan cycle executed over a workpiece, into a virtual model; defining a nominal toolpath and a nominal target force for the workpiece based on a the virtual model; detecting a defect indicator on the workpiece based on the lower-resolution images; accessing a higher-resolution image captured during a local scan cycle over the defect indicator; characterizing the defect indicator as a defect reparable via material removal based on the higher-resolution image; defining a repair toolpath for the defect based on the virtual model; navigating a sanding head over the workpiece according to the repair toolpath to repair the defect; and, during a processing cycle: navigating the sanding head across the workpiece according to the nominal toolpath and deviating the sanding head from the nominal toolpath to maintain forces of the sanding head on the workpiece proximal the nominal target force.

20 Claims, 5 Drawing Sheets

Related U.S. Application Data continuation-in-part of application No. 18/111,470, filed on Feb. 17, 2023, now Pat. No. 12,049,009, which is a continuation of application No. 17/829,193, filed on May 31, 2022, now Pat. No. 11,613,014, which is a continuation of application No. 17/826,840, filed on May 27, 2022, which is a continuation-in-part of application No. 17/390,885, filed on Jul. 31, 2021, now abandoned.

(60) Provisional application No. 63/059,932, filed on Jul. 31, 2020.

(51) Int. Cl.
| | |
|---|---|
| *B25J 11/00* | (2006.01) |
| *B25J 13/08* | (2006.01) |
| *G06T 1/00* | (2006.01) |
| *G06T 7/13* | (2017.01) |
| *G06T 7/60* | (2017.01) |
| *G06T 19/00* | (2011.01) |

(52) U.S. Cl.
CPC .......... *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
CPC . B25J 13/085; B25J 5/005; B25J 9/162; B25J 9/1684; B25J 19/023; B24B 51/00; G06T 1/0014; G06T 7/13; G06T 7/60; G06T 19/00; G06T 2207/10024; G06T 2219/004; G05B 2219/45082
See application file for complete search history.

(56) References Cited

U.S. PATENT DOCUMENTS

| | | | |
|---|---|---|---|
| 2018/0283019 A1* | 10/2018 | Telleria | E04F 21/16 |
| 2020/0171620 A1* | 6/2020 | Aubin | B24B 49/12 |
| 2021/0260720 A1* | 8/2021 | Chankaramangalam | B24B 49/12 |
| 2024/0300539 A1* | 9/2024 | Donderici | G01S 13/86 |

* cited by examiner

METHOD FOR AUTONOMOUSLY REPAIRING SURFACE DEFECTS IN A WORKPIECE THROUGH SURFACE MODIFICATIONS

CROSS-REFERENCE TO RELATED APPLICATIONS

This application is a continuation of U.S. patent application Ser. No. 18/142,480, filed on 2 May 2023, which is a continuation-in-part of U.S. patent application Ser. No. 18/111,470, filed on 17 Feb. 2023, which is a continuation of U.S. patent application Ser. No. 17/829,193, filed on 31 May 2022, which is a continuation of U.S. patent application Ser. No. 17/826,840, filed on 27 May 2022, which is a continuation-in-part of U.S. patent application Ser. No. 17/390,885, filed on 31 Jul. 2021, which claims the benefit of U.S. Provisional Application No. 63/059,932, filed on 31 Jul. 2020, each of which is incorporated in its entirety by this reference.

TECHNICAL FIELD

This invention relates generally to the field of automated finishing and more specifically to a new and useful system and method for autonomously detecting and repairing defects in a workpiece in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: Defect Detection and Repair Followed by Processing

Figure 1:
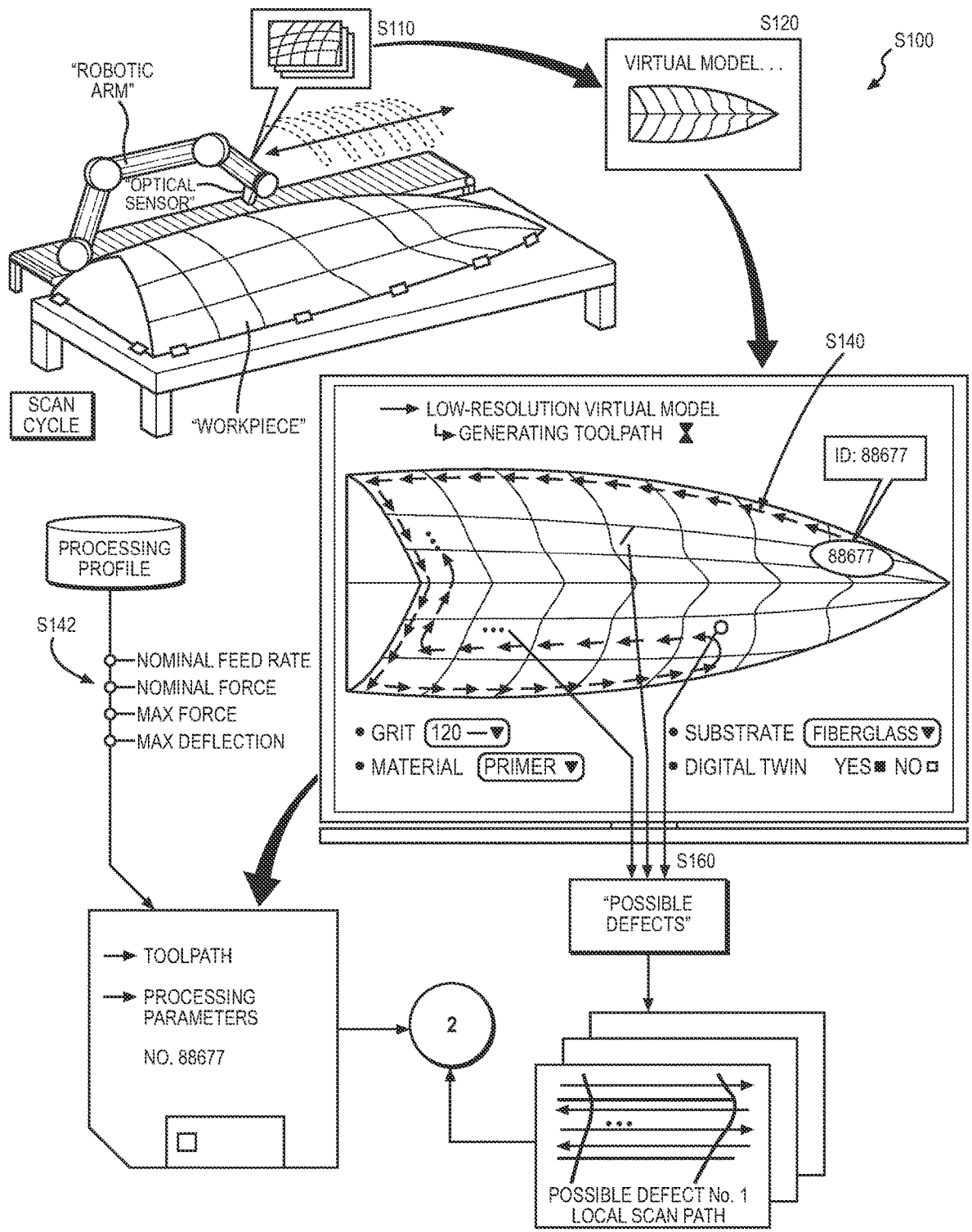
FIG. 1 is a flowchart representation of a method.
Figure 2:
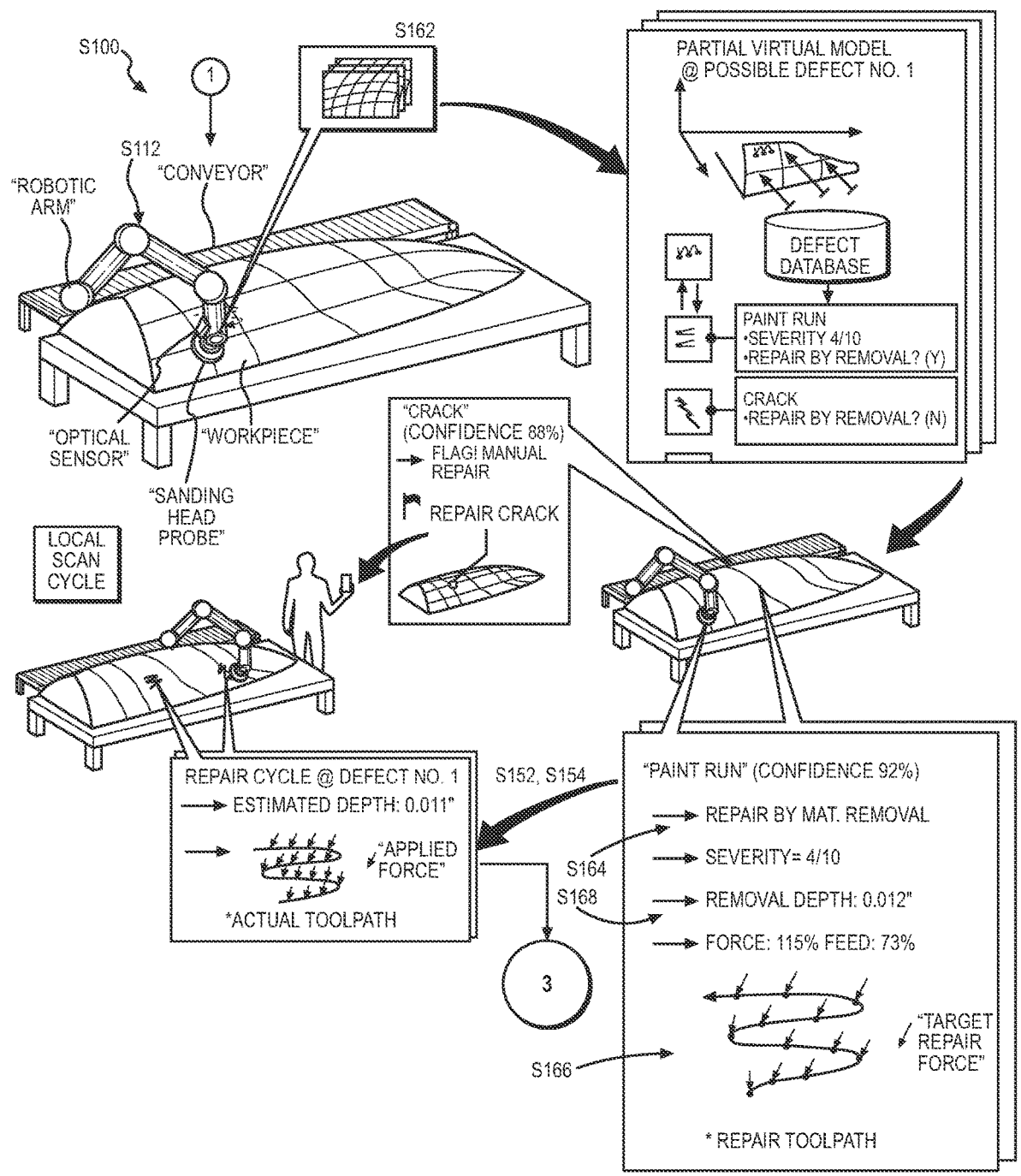
FIG. 2 is a flowchart representation of one variation of the method.
Figure 3:
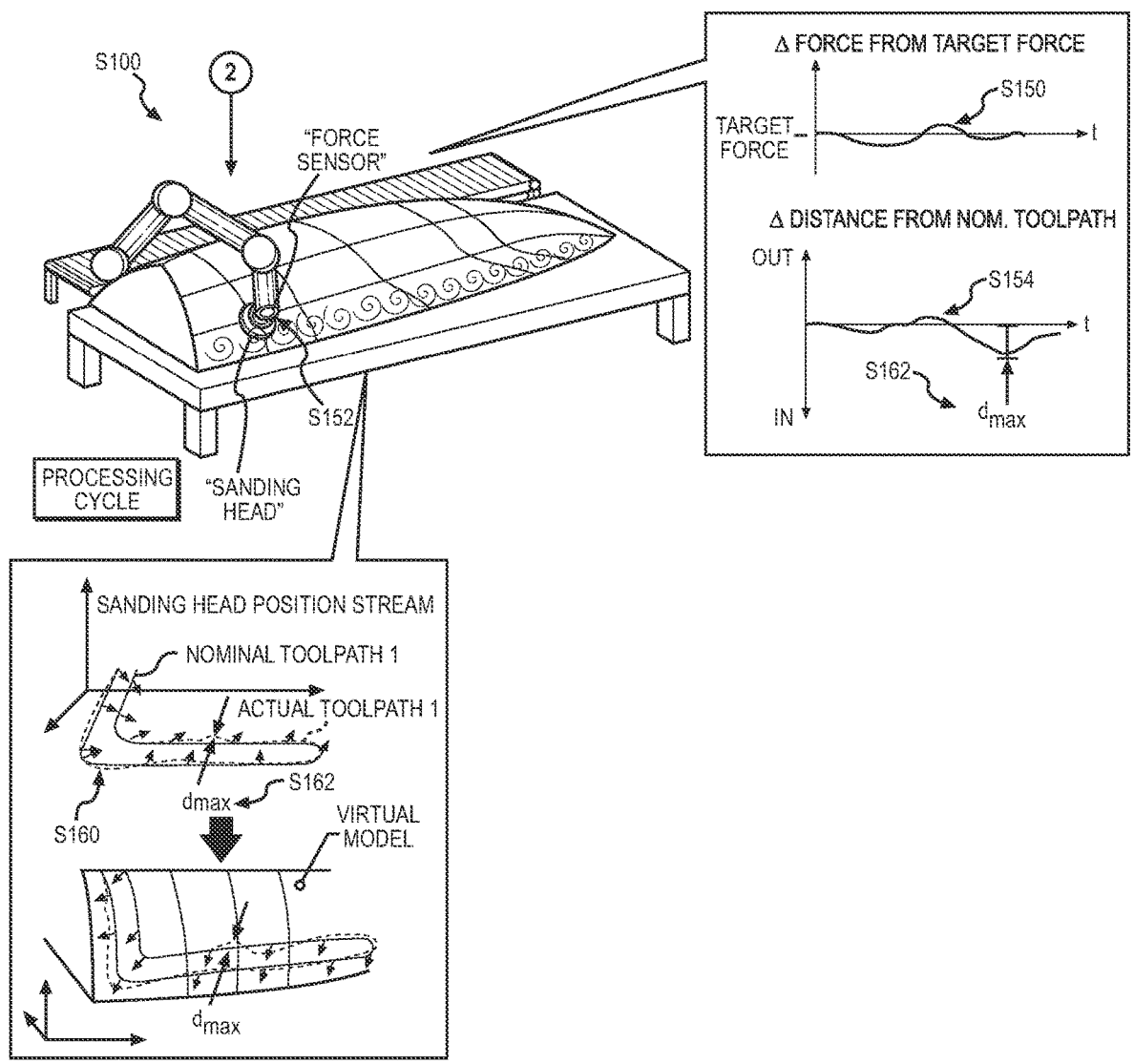
FIG. 3 is a flowchart representation of one variation of the method.

As shown in FIGS. 1, 2, and 3, a method S100 for autonomously processing a workpiece includes: accessing a first set of images captured by an end effector while traversing a global scan path over a workpiece during a global scan cycle in Block S110; compiling the first set of images into a virtual model of the workpiece in Block S120; generating a first toolpath for the workpiece based on a geometry of the workpiece represented in the virtual model in Block S140; assigning a first target force to the first toolpath in Block S142; based on the first set of images, detecting a first defect indicator in a first workpiece region of the workpiece in Block S160; based on the first defect indicator, accessing a second set of images captured by the end effector while traversing a local scan path over the first workpiece region during a local global scan cycle in Block S162; based on the second set of images, characterizing the first defect indicator as a first defect repairable via material removal from the workpiece in Block S164; and generating a repair toolpath for the first defect based on a first geometry of the first workpiece region represented in the virtual model in Block S166.

The method S100 also includes, during a repair cycle, via a set of actuators coupled to the end effector, navigating a sanding head across the first workpiece region according to the repair toolpath in Block S152, the sanding head coupled to the end effector.

The method S100 further includes, during a processing cycle: accessing a first sequence of force values output by a force sensor coupled to the sanding head in Block S150; via the set of actuators, navigating the sanding head across the workpiece according to the first toolpath in Block S152; and, based on the first sequence of force values, deviating the sanding head from the first toolpath to maintain forces of the sanding head on the workpiece proximal the first target force in Block S154.

1.1 Variation: Interleaved Defect Repair and Processing

One variation of the method S100 shown in FIGS. 1, 2, and 3 includes: accessing a first set of images captured by an end effector while traversing a global scan path over a workpiece during a global scan cycle in Block S110, the first set of images characterized by a first resolution; compiling the first set of images into a virtual model of the workpiece in Block S120; based on the first set of images, detecting a first defect indicator in a first workpiece region of the workpiece in Block S160; based on the first defect indicator, accessing a second set of images captured by the end effector while traversing a local scan path over the first workpiece region during a local global scan cycle in Block S162, the second set of images characterized by a second resolution greater than the first resolution; based on the second set of images, characterizing the first defect indicator as a first defect reparable via material removal from the workpiece in Block S164; based on a geometry of the workpiece represented in the virtual model, generating a first toolpath for the first workpiece region in Block S166 and generating a second toolpath for a second workpiece region, adjacent the first workpiece region, of the workpiece in Block S140; assigning a first target force, corresponding to a first material removal depth, to the first toolpath based on the first defect in Block S168; and assigning a second target force, corresponding to a second material removal depth, to the second toolpath in Block S142.

This variation of the method S100 also includes, during a processing cycle accessing a sequence of force values output by a force sensor coupled to the sanding head in Block S150 and, via a set of actuators coupled to the end effector: navigating a sanding head, coupled to the end effector, across the workpiece according to the first toolpath in Block S152; based on the sequence of force values, deviating the sanding head from the first toolpath to maintain forces of the sanding head on the first workpiece region proximal the first target force in Block S154; navigating the sanding head across the second workpiece region according to the second toolpath in Block S152; and, based on the sequence of force values, deviating the sanding head from the second toolpath to maintain forces of the sanding head on the second workpiece region proximal the second target force in Block S154.

1.2 Variation: Processing with Interleaved Defect Detection and Repair

Another variation of the method S100 shown in FIGS. 1, 2, and 3 includes: accessing a first set of images captured by an end effector while traversing a global scan path over a workpiece during a global scan cycle in Block S110, the first set of images characterized by a first resolution; compiling the first set of images into a virtual model of the workpiece in Block S120; generating a first toolpath for the workpiece based on a geometry of the workpiece represented in the virtual model in Block S140; assigning a first target force to the first toolpath in Block S142; and, based on the first set of images, detecting a first defect indicator in a first workpiece region of the workpiece in Block S160.

This variation of the method S100 also includes, during a processing cycle: accessing a sequence of force values output by a force sensor coupled to the sanding head in Block S150; via a set of actuators coupled to the end effector, navigating a sanding head, coupled to the end effector, across the workpiece according to the first toolpath in Block S152 and, based on the sequence of force values, deviating the sanding head from the first toolpath to maintain forces of the sanding head on the workpiece proximal the first target force in Block S154. This variation of the method S100 further includes, during the processing cycle and in response to the sanding head approaching the first workpiece region: pausing navigation of the sanding head along the first toolpath; and navigating the end effector over the first workpiece region to capture a second set of images of the first workpiece region during the local global scan cycle in Block S162. This variation of the method S100 also includes, during the processing cycle: based on the second set of images, characterizing the first defect indicator as a first defect reparable via material removal from the workpiece in Block S164; generating a repair toolpath for the first defect based on the geometry of the workpiece represented in the virtual model in Block S166; via the set of actuators, navigating the sanding head across the first workpiece region according to the repair toolpath in Block S152; and, in response to the sanding head completing the repair toolpath, resuming navigation of the sanding head along the first toolpath.

2. Applications

Generally, an autonomous scanning and sanding system (hereinafter the "system") can execute Blocks of the method S100: to autonomously capture scan data of a workpiece occupying a work cell during a rapid, contactless global scan cycle; to compile these scan data into a virtual three-dimensional model of the workpiece; to generate a toolpath spanning surfaces represented in the virtual model and defining a sequence of nominal positions and orientations traversable by a sanding head to sand (hereinafter "process") the workpiece; and to assign a target force for application of the sanding head on the workpiece.

The system can further execute Blocks of the method S100 during a processing cycle: to track forces applied by the sanding head to the workpiece; and to advance and retract the sanding head normal to the workpiece while navigating the sanding head along the toolpath to maintain forces applied by the sanding head to the workpiece at the target force, thereby achieving predictable material removal across the workpiece and a consistent surface finish across the workpiece.

The system also executes Blocks of the method S100 to: extract two-dimensional (e.g., color) features in two-dimensional images (e.g., color photographic images, infrared images) and/or three-dimensional (e.g., edge, depth) features in three-dimensional images (e.g., depth maps) captured during the global scan cycle; interpret these features as a possible defect in a particular region of the workpiece; and autonomously coordinate a higher-resolution, local scan of this particular location on the workpiece, such as before or during the processing cycle. The system can then: confirm presence of this defect on the workpiece based on these higher-resolution scan data; and determine whether the defect is repairable through material removal from the workpiece, such as a scratch, a chip, a paint sag, a paint curtain, a paint bubble, pitting, orange peel, a rough edge, and dry spray.

The system can further execute Blocks of the method S100 to characterize severity of the defect and classify the defect as: low-severity and repairable via a nominal toolpath during a nominal processing cycle; moderate-severity and repairable via a separate repair cycle execute during a separate repair cycle (e.g., to bring a surface profile of the workpiece at the defect to a nominal surface condition in adjacent non-defective regions of the workpiece); or high-severity and requiring manual repair.

If the system identifies the defect as repairable via material removal and necessitating a separate repair cycle, the system can: define repair parameters (e.g., target repair force, feed rate, stepover distance) based on characteristics of the defect; generate a local repair toolpath around the defect based on a geometry of the workpiece defined in the virtual model around the defect and these repair parameters; and then execute a repair cycle based on these repair parameters and the repair toolpath to repair the defect, such as before or during the processing cycle described above. More specifically, the system can autonomously navigate the sanding head along the repair toolpath and implement closed-loop controls to maintain a target repair force applied the sanding head on the workpiece.

Furthermore, if the defect is too severe or not repairable via material removal, the system can: generate a prompt to repair the defect; annotate the prompt with a detected type, location, and/or severity of the defect; and serve the prompt to an operator. Additionally or alternatively, the system can annotate the virtual model of the workpiece with the type and severity of the defect and serve (e.g., render) this annotated virtual model to the operator.

Therefore, the system can execute Blocks of the method S100 that autonomously detect and repair defects present on a workpiece, such as before or while autonomously processing a larger area of the workpiece.

Furthermore, the system is described herein as executing Blocks of the method S100 to autonomously repair a defect detected on a workpiece by applying a sanding pad to (or "sanding") the defect and then applying a sanding pad (of the same or lesser abrasiveness) to the entire workpiece to bring the entire workpiece to the same level of sanded finish. Alternatively, the system can execute Blocks of the method S100 to autonomously repair a defect detected on a workpiece by applying a polishing pad or a buffing pad to (or "polishing" or "buffing") the defect and then applying the polishing or buffing pad (of the same or lesser abrasiveness) to the entire workpiece to bring the entire workpiece to the same level of polished or buffed finish. Yet alternatively, the system can execute Blocks of the method S100 to autonomously repair a defect detected on a workpiece by applying a sanding pad, then a polishing pad, and/or then a buffing pad to the defect. For example, the system can execute Blocks of the method S100 to: detect a run in a clearcoat on a workpiece; apply a sanding pad to the defect to remove the run in the clearcoat; then apply a polishing pad to the entire workpiece to polish the clearcoat; and then apply a buffing pad to the entire workpiece to buff the clearcoat. However, the system can execute Blocks of the method S100 to autonomously apply a sanding pad, a polishing pad, and/or a buffing pad to detected defects and/or the entire workpiece, such as to rapidly remove these defects and then bring the entire workpiece surface to a consistent surface finish.

3. System

In one implementation described in U.S. patent application Ser. No. 18/111,470 and shown in FIG. 1, the system includes: a robotic arm arranged in or adjacent a work zone and that includes a set of articulatable joints interposed between a series of arm segments; an end effector supported on a distal end of the robotic arm; a sanding head arranged on or integrated into the end effector and configured to actuate (e.g., rotate) a sanding disk; an optical sensor (e.g., a set of depth sensors and/or color cameras) arranged on or integrated into the end effector and configured to capture optical images (e.g., depth maps, photographic color images) of a workpiece; a force sensor (e.g., a one-dimensional axial force sensor) configured to output a signal representing a force applied by the sanding head to a workpiece normal to the sanding head; a set of position sensors configured to output signals representing (or assemblable into) a three-dimensional position of the end effector; a display configured to render a user interface accessible by an operator; and/or a controller configured to execute Blocks of the method S100.

In this implementation, the system can also include a range-extender configured to traverse the robotic arm longitudinally along the work zone, such as to reach and process an elongated part defining a high length-to-width ratio (e.g., a high aspect ratio), such as a boat hull or aircraft wing.

In another implementation, the system includes a multi-axis (e.g., five-axis) gantry configured to locate and articulate the end effector, sanding head, and optical sensor(s) across the work zone.

Figure 5:
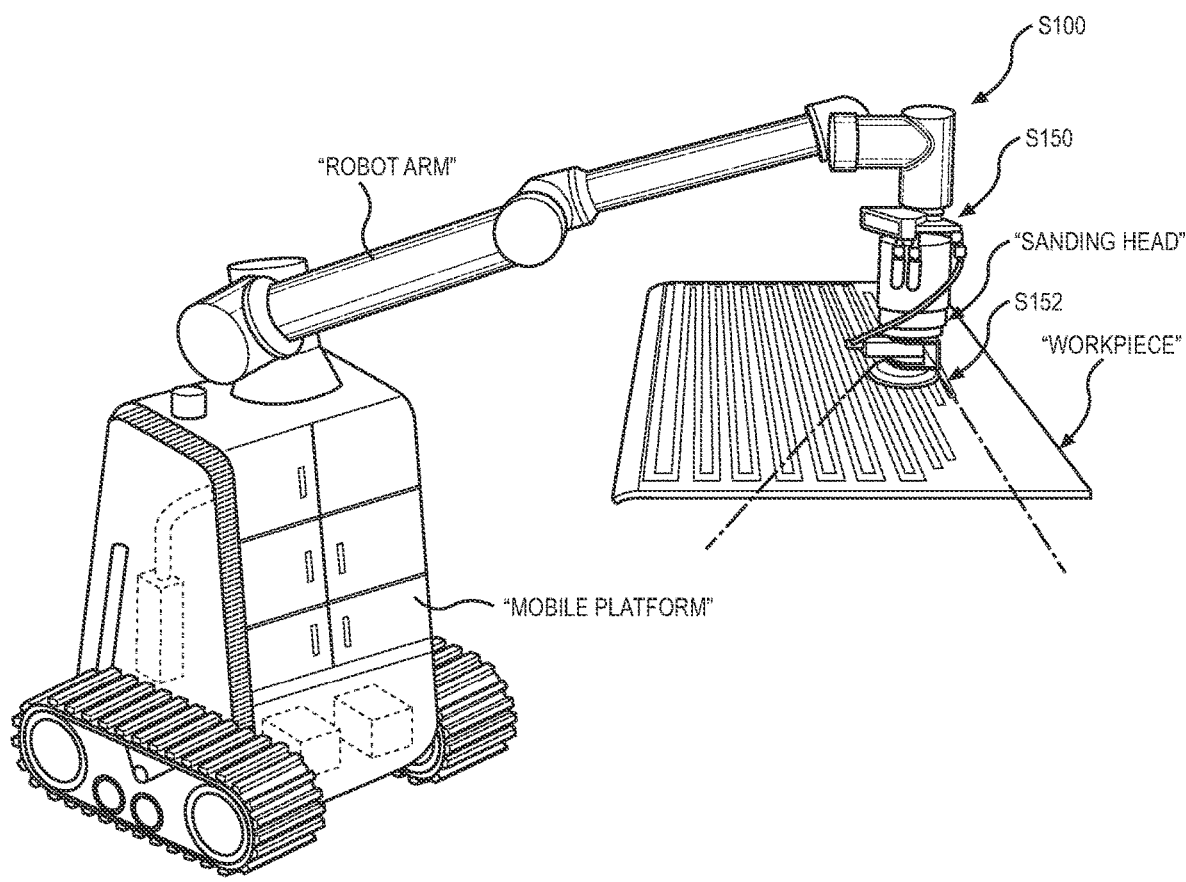
FIG. 5 is a schematic representation of one variation of the method.

In yet another implementation shown in FIG. 5, the system includes: a mobile platform, such as including a wheeled or tracked chassis; a robotic arm arranged on the mobile platform; a sanding head (e.g., an end effector) arranged on a distal end of the robotic arm; and a navigation system. For example, the navigation system can include: a set of optical color and/or depth sensors arranged on the mobile platform and configured to capture images of a scene around the system; and a controller configured to autonomously navigate the mobile platform around a workpiece based on objects detected in images captured by these optical color and/or depth sensors.

However, the system can include or define any other element or structure.

4. Workpiece Loading and Processing Inputs

In one variation, the system retrieves processing inputs and/or other parameters for autonomously sanding the workpiece, such as once an operator loads the workpiece into the work zone adjacent the system.

In particular, in preparation for autonomously processing (e.g., sanding) a workpiece by the system, an operator locates the workpiece in the work zone adjacent the system. For example, the operator may: load the workpiece onto a support rig (e.g., a wheeled table) and install intermittent clamps on the workpiece to retain the workpiece on the support rig; place the support rig and workpiece into the work zone; and lock wheels of the support rig.

4.1 Processing Limits

The system can then prompt the operator to supply processing limits for the workpiece, such as including: a maximum applied force (i.e., a maximum force applied by the sanding head to any region of the workpiece); a maximum applied pressure (e.g., a maximum force applied by the sanding head to any unit area of the workpiece); and a maximum deformation of the workpiece (e.g., a maximum distance of a point on the workpiece in an unloaded position to a loaded position when the system applies the sanding head to the workpiece). For example, the operator can supply these processing limits based on known strengths and compliance characteristics of the workpiece.

Additionally or alternatively, the system can retrieve these processing limits from a predefined processing profile. For example, the system can select a predefined processing profile stored in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system. The system can then load processing limits extracted from this processing profile.

4.2 Material Removal Targets

In another implementation, the system prompts the operator to manually input properties of and/or processing targets for the workpiece (e.g., through a set of dropdown menus), such as: material type; coating types (e.g., none, gel coat, epoxy, primer, base coat, clear coat); target, maximum and/or minimum material removal depth (e.g., 0.002" to 0.010"); and/or output surface quality (e.g., sanded to 80-, 150-, 220-, 320-, or 400-grit; buffed; polished). Alternatively, the system can prompt the operator to select a material removal profile—such as from a set of material removal profiles stored in a processing database—containing these data.

The system can then select a sanding disk of a sanding grit corresponding to the target output surface quality and implement methods and techniques described below to generate a nominal toolpath and set a nominal target force for processing the workpiece based on: this sanding grit; the target, maximum and/or minimum material removal depth; and/or a maximum applied force or pressure set for the workpiece.

However, the system can retrieve or load processing limits for the workpiece based on any other data supplied by the operator or collected autonomously by the system during a global scan cycle as described below.

5. Global Workpiece Scan

Blocks S112, S110, and S120 of the method S100 recite: navigating an end effector over a workpiece; accessing a set of images captured by an optical sensor arranged on the end effector while traversing the workpiece; and compiling the set of images into a virtual model representing unloaded surfaces of the workpiece. Generally, in Blocks S112, S110, and S120, the system can implement methods and techniques described in U.S. patent application Ser. No. 18/111, 470 to: autonomously navigate an optical sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece within a relatively wide dimensional tolerance (e.g., +/−0.35") and/or relatively low resolution, as shown in FIG. 1.

For example, after the operator loads the workpiece into the work zone and confirms processing limits for the workpiece, the system can initiate a global scan cycle. During the global scan cycle, the system can: navigate the optical sensor—located on the end effector—along the scan path over and offset above the workpiece; monitor a distance between the end effector and the workpiece based on depth data collected by the optical sensor; and implement closed-loop controls to maintain a target offset distance between the optical sensor and the workpiece (e.g., 20", 50 centimeters). In this example, for a workpiece defining an elongated geometry including a long axis located approximately parallel to a longitudinal axis of the work zone, the system can actuate a conveyor supporting the robotic arm to traverse the robotic arm along the longitudinal axis of the work zone while rastering the end effector and the optical sensor laterally across the work zone to capture a sequence of optical images representing all surfaces of the workpiece accessible by a sanding head on the end effector.

The system can thus capture scan data—such as color photographic images, stereoscopic images, two-dimensional infrared images, depth maps, and/or LIDAR images—from a set of optical sensors arranged on the end effector while traversing the end effector across (e.g., over and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the global scan cycle.

The system then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

However, the system can implement any other methods or techniques to navigate the end effector and optical sensor over the workpiece, to collect optical images of the workpiece, and to generate a virtual three-dimensional model of the workpiece based on these optical images.

6. Nominal Workpiece Segmentation

In one variation shown in FIGS. 1 and 2, the system segments the workpiece into workpiece regions. For example, the system can segment the virtual model of the workpiece into: approximately-flat regions; concave regions; convex regions; workpiece perimeter regions; regions containing edges; and/or regions containing orifices or apertures. In another example, the system can: define a first workpiece region containing a contiguous convex surface; define a second workpiece region containing a contiguous concave surface; and define a third workpiece region containing a contiguous surface approximating a planar geometry (e.g., defining a large effective radius); etc. In yet another example, the system can: define a first contiguous workpiece region characterized by high detected, predicted, or annotated stiffness; define a second contiguous workpiece region characterized by moderate detected, predicted, or annotated stiffness; and define a third contiguous workpiece region characterized by low detected, predicted, or annotated stiffness; etc. In another example, the system can project a predefined boundary grid onto the virtual model and define workpiece regions according to boundaries defined in this boundary grid.

In the foregoing examples, the system can also define workpiece regions spanning target widths, lengths, and/or surfaces areas spanning less than maximum widths, lengths, and/or surfaces areas.

However, the system can segment the workpiece in any other way and according to any other workpiece characteristics.

The system can then define a toolpath, assign a target force, and set a feed rate of the sanding head for each workpiece region.

7. Target Force Parameters

Block S142 of the method S100 recites: assigning a first target force to the first workpiece region. Generally, in Block S142, the system assigns target forces to workpiece regions of the workpiece, such as: based on autonomously-detected, manually-indicated, or derived (e.g., interpolated) maximum compliance (or minimum stiffness) characteristics of these regions; based on geometries (e.g., concave and convex contours, profiles) in these regions of the workpiece; and/or based on a material or part type of the workpiece.

In one implementation, the system retrieves a single nominal target force from the predefined processing profile described above and assigns this target force to the entire workpiece, as shown in FIG. 1.

In another implementation, the system defines boundaries between contiguous regions of the workpiece exhibiting similar contours, such as between contiguous concave, convex, and approximately flat regions of the workpiece spanning more than a minimum surface area (e.g., four square feet). The system then assigns target forces to each region, such as: highest forces in concave regions that may be least susceptible to plastic deformation due to high force application by the sanding head; moderate forces in flat regions that may be more susceptible to plastic deformation due to force application by the sanding head; lowest forces in convex regions that may be most susceptible to plastic deformation due to high force application by the sanding head; and/or force magnitudes within a region proportional to the smallest radius within the region. The system can also annotate these regions and corresponding target forces in the virtual model of the workpiece.

Additionally or alternatively, the system can retrieve or calculate a target nominal force for each region of the workpiece, such as: proportional to a detected or indicated stiffness in a workpiece region; or proportional to a minimum effective radius of the workpiece region.

8. Nominal Toolpath Generation

The system can further implement methods and techniques described in U.S. patent application Ser. No. 18/111,470 to define a toolpath within each region of the workpiece.

In one implementation shown in FIG. 1, the system sets a nominal target force—for application of the sanding head on the workpiece—less than the maximum applied force and/or based on (e.g., inversely proportional to) an operator-indicated or system-derived stiffness of a region of the workpiece. The system further: retrieves a function that relates contact duration (i.e., a time or rotation count of a sanding disk in contact with a workpiece), applied force (or pressure), sanding disc grit, and material removal depth; selects a sanding disc grit for the workpiece based on an output surface quality selected for the workpiece by the operator; and calculates a nominal contact duration for the workpiece based on the nominal target force, the sanding disc grit, and the target material removal depth.

The system then sets or calculates a combination of pitch offset between legs of a toolpath (or "stepover distance") and a feed rate for the toolpath that yields the nominal contact duration. In particular, a higher feed rate may yield less contact time between the sanding head and a unit area of the workpiece; and vice versa. Similarly, a wider stepover distance for the toolpath may yield less contact time between the sanding head and a unit area of the workpiece; and vice versa. For example, the system can set a feed rate and a stepover distance—inversely proportional to feed rate—based on feed rate preferences set by the operator. Alternatively, the system can: set a lower feed rate and wider stepover distance for segments of a toolpath intersecting a region of the workpiece characterized by a large radius in which a large proportion of the sanding disk is in contact with the workpiece; and set a higher feed rate and narrower stepover distance for segments of a toolpath intersecting a region of the workpiece characterized by a small radius in which a smaller proportion of the sanding disk is in contact with the workpiece. The system can therefore set or retrieve a nominal target force, a stepover distance, and a feed rate for each region of the workpiece.

The system then generates a nominal toolpath for each region of the workpiece. In one implementation, the system: defines a serpentine or boustrophedonic toolpath within a first region of the workpiece according to a stepover distance set for the first workpiece region; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model. The system can then extract a three-dimensional position and normal vector of each vertex or other point on the first toolpath from the virtual model. Accordingly, the system can store the first toolpath for the first workpiece region as a first ordered sequence of keypoints: located on a first surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece.

The system can repeat this process for each other region of the workpiece.

Alternatively, the system can implement the foregoing methods and techniques to generate a single continuous toolpath spanning the entire workpiece or spanning another partial or complete surface of the workpiece selected for autonomous processing by the system.

9. Nominal Processing Cycle

Block S150 of the method S100 recites accessing a first sequence of force values output by a force sensor coupled to a sanding head arranged on the end effector. Blocks S152 and S154 of the method S100 recite, via a set of actuators coupled to the end effector: navigating the sanding head across the first workpiece region according to the first toolpath; and, based on the first sequence of force values, deviating the sanding head from the first toolpath to maintain forces of the sanding head on the first workpiece region proximal the first target force.

Generally, in Blocks S150, S152, and S154, the system can implement methods and techniques described in U.S. patent application Ser. No. 18/111,470 to autonomously navigate the sanding head along a toolpath (e.g., a sequence of keypoints) defined within a region of the workpiece and to maintain a target normal force between the sanding head and the workpiece by selectively moving the sanding head into and away from the workpiece normal to the surface of the workpiece represented in the virtual model, as shown in FIG. 3.

The system also implements closed-loop controls to maintain a target force between the sanding head and the workpiece within each workpiece region—based on force values read from the force sensor integrated into the sanding head—by driving the sanding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the sanding head at a first three-dimensional position intersecting the first keypoint; align an axis of the sanding head to a first vector contained in the first keypoint; and drive the sanding head, coaxial with the first vector, toward the workpiece to match force values, in a sequence of force values read from the force sensor in the sanding head, to a first target force assigned to a first toolpath containing the first keypoint. The system can then drive the set of actuators to interpolate a three-dimensional path and sanding head orientation from the first keypoint to the second keypoint while implementing closed-loop controls to apply the sanding head to the workpiece with the first target force. The system can repeat this process for each other keypoint defined along the first toolpath and then along subsequent toolpaths defined for other regions of the workpiece.

In a similar implementation, in Block S140, the system defines a first ordered sequence of keypoints located on the virtual model. For each keypoint in the first ordered sequence of keypoints, the system: calculates a vector normal to the virtual model at a location of the keypoint on the virtual model; and stores the vector in the keypoint. The system then stores the first ordered sequence of keypoints as the first toolpath. Then, for a first keypoint in the first ordered sequence of keypoints, the system: locates the sanding head at a first position intersecting the first keypoint in Block S152; aligns an axis of the sanding head to a first vector contained in the first keypoint; and drives the sanding head, coaxial with the first vector, toward the workpiece to match force values, in the first sequence of force values read from the force sensor, to the first target force in Block S154.

10. Possible Defect Detection in Scan Data

Figure 4:
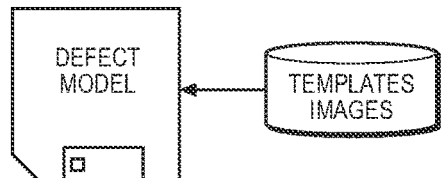
FIG. 4 is a flowchart representation of one variation of the method.

Block S160 of the method S100 recites, based on the first set of images, detecting a first defect indicator in a first workpiece region of the workpiece. Generally, in Block S160, the system detects features represented in images captured during the global scan cycle and/or features in the virtual model of the workpiece—generated from images captured during the global scan cycle—that indicate possible defects in the workpiece, such as: scratches; chips; gouges; cracks; flaking; rust or substrate bleed-through; incomplete paint coverage; paint sags; paint curtains; paint bubbles; pitting; orange peel; rough edges; and/or dry spray; etc., as shown in FIGS. 1 and 4.

More specifically, the system can capture relatively low-resolution optical data—such as 2D photographic images, stereoscopic color images, depth maps, or LIDAR images, etc.—while navigating the end effector (e.g., including the sanding head) over the workpiece during the global scan cycle in Block S110. The system can then implement edge detection, template matching, object recognition, or other computer vision or artificial intelligence techniques: to detect two-dimensional color features in these two-dimensional photographic images that may indicate a defect in the workpiece; to detect three-dimensional (e.g., edge) features in these three-dimensional images that may indicate a defect in the workpiece; and/or to detect two- or three-dimensional features in the virtual model that may indicate a defect in the workpiece.

10.1 Two-Dimensional Feature as Possible Defect

Generally, scratches, orange peel, pitting, incomplete paint coverage, rust or substrate bleed-through, and dry spray may present on a workpiece as two-dimensional features (or "2.5D" features) projected onto a surface of the workpiece. Accordingly, in Block S160, the system can detect these defects as edges or color discontinuities in two-dimensional images (e.g., two-dimensional color photographic images) of the workpiece captured in Block S110, as shown in FIG. 4.

In one implementation, in Block S110, the system accesses: a first set of depth maps captured by a depth sensor arranged on the end effector while traversing the global scan path during the global scan cycle; and a first set of photographic images—of a first resolution—captured by a two-dimensional color camera arranged on the end effector while traversing the global scan path during this global scan cycle. The system then: compiles these depth maps into the virtual model in Block S120; detects a two-dimensional discontinuity (e.g., a color break, an edge) in a photographic image—in the first set of photographic images—depicting a first region of the workpiece; and stores this two-dimensional discontinuity as a defect indicator (i.e., a "possible defect") present in the first region of the workpiece.

As described below, the system can then: flag this first region of the workpiece containing this defect indicator for a local scan to capture higher-resolution data in Block S162; and verify presence, type, and repair mode of the defect on the workpiece based on these higher-resolution data in Block S164. For example and as described below, the system can characterize this defect indicator as a scratch, orange peel, or dry spray defect type based on two-dimensional features extracted from these higher-resolution data depicting the first region of the workpiece.

10.2 Three-Dimensional Feature as Possible Defect

Similarly, chips, gouges, cracks, flaking, paint sags, paint curtains, and paint bubbles may present on a workpiece as three-dimensional features extending above or below a nominal surface of the workpiece. Accordingly, in Block S160, the system can detect these defects as three-dimensional surface discontinuities in three-dimensional images (e.g., depth maps, stereoscopic color images, LIDAR images) of the workpiece captured in Block S110, as shown in FIG. 4.

In one implementation, the system accesses: a first set of depth maps captured by a depth sensor arranged on the end effector while traversing the global scan path during the global scan cycle in Block S110; compiles these depth maps into the virtual model in Block S120; detects a nominal, continuous surface across the workpiece in a particular depth map depicting a first region of the workpiece; detects a three-dimensional discontinuity (e.g., an edge, a small feature) extending above or below the nominal, continuous surface represented in the depth map; and stores this two-dimensional discontinuity as a defect indicator (i.e., a "possible defect") present in the first region of the workpiece. Additionally or alternatively, the system can: interpret a nominal, continuous surface across the workpiece in the virtual model; detect a three-dimensional surface discontinuity extending above or below the nominal, continuous surface represented in a first region of the virtual model; and store this two-dimensional discontinuity as a defect indicator (i.e., a "possible defect") present in a corresponding first region of the workpiece.

As described below, the system can then: flag this first region of the workpiece containing this defect indicator for a local scan to capture higher-resolution data in Block S162; and verify presence, type, and repair mode of the defect on the workpiece based on these higher-resolution data in Block S164. For example and as described below, the system can characterize this defect indicator as a chip, gouge, crack, flaking, paint sag, paint curtain, or paint bubble based on three-dimensional features extracted from these higher-resolution data depicting the first region of the workpiece.

Conversely, the system can implement methods and techniques described above to detect possible presence of these defect types in two-dimensional images (e.g., color photographic images) captured during the global scan cycle.

However, the system can implement any other method or technique to detect two-dimensional and/or three-dimensional features—in raw two- or three-dimensional images captured in Block S110 or in the virtual model of the workpiece generated in Block S120—that may indicate presence of local defects in the workpiece. The system can then flag locations of the possible defects on the workpiece for higher-resolution two-dimensional and/or three-dimensional scans.

11. Local Scan Cycle

Block S162 of the method S100 recites, based on the first defect indicator, accessing a second set of images captured by the end effector while traversing a local scan path over the first workpiece region during a local global scan cycle. Generally, in Block S162, the system can: autonomously navigate the end effector—including two- and/or three-dimensional optical sensors—over each region of the workpiece containing a defect indicator (i.e., a possible defect) detected in Block S160 based on lower-resolution data captured during the global scan cycle; and capture higher resolution two- and/or three-dimensional images of these regions of the workpiece, as shown in FIG. 2.

In one implementation, during the global scan cycle, the system: captures depth maps via a depth sensor or LIDAR sensor and color photographic images via a color camera arranged in the end effector in Block S110; detects the workpiece in the depth maps and calculates shortest distances between the end effector and the workpiece; autonomously navigates the end effector over the workpiece at a global feed rate (e.g., one meter per second) while maintaining a target global minimum distance (e.g., one meter) between the end effector and the workpiece; implements image stitching, structure from motion, and/or other techniques to assemble these depth maps and/or photographic images into the virtual model in real-time; characterizes resolution of the virtual model based on mesh density of the virtual model; and ceases the global scan cycle once the virtual model depicts a complete, continuous perimeter of the workpiece and once the resolution of each region of the virtual model exceeds a global minimum resolution.

For example, in this implementation, in response to detecting a defect indicator in these lower-resolution global scan data, the system can: define a local scan region around this defect indicator, such as a region (e.g., a circular region) radiating 30 centimeters outwardly from the defect indicator; define a spiral, serpentine, or boustrophedonic local scan path over this local scan region; set a target local minimum distance (e.g., 30 centimeters) less than the target global minimum distance; and set a local feed rate (e.g., 0.3 meters per second) less than the global feed rate. Then, during a local scan cycle for the defect indicator, the system: captures depth maps and/or color photographic images in Block S160; autonomously navigates the end effector along the local scan path (or otherwise navigates the end effector over the workpiece) at the local feed rate while maintaining the target local minimum distance between the end effector and the workpiece; and implements image stitching, structure from motion, and/or other techniques to assemble these depth maps and/or photographic images into a higher-resolution two- or three-dimensional representation of the local scan region.

Alternatively, rather than preemptively calculate the local scan path for the local scan region, the system can: navigate the end effector to the defect indicator on the workpiece; capture depth maps and/or color photographic images in Block S160; calculate shortest distances between the end effector and the workpiece; autonomously navigate the end effector over the workpiece—and around the defect indicator—at the local feed rate while maintaining the target local minimum distance between the end effector and the workpiece; implement image stitching, structure from motion, and/or other techniques to assemble these depth maps and/or photographic images into a two- or three-dimensional representation of the local scan region; characterize resolution of the defect indicator in this representation of the local scan region based on its mesh density; and cease the local scan cycle once this representation of the local scan region depicts the defect indicator at a resolution greater than a local minimum resolution greater than the global minimum resolution.

The system can repeat this process for each defect indicator detected in Block S160 in order to capture high-resolution two- and/or three-dimensional data depicting small, discrete regions of the workpiece that contain each defect indicator. Furthermore, the system can execute this process in Block S160 after completing the global scan cycle and before initiating the processing cycle to process the entire workpiece (or particular regions of the workpiece selected by the operator and/or excluding defects).

Alternatively, as described below, the system can: initiate the processing cycle to autonomously sand the workpiece after completing the global scan cycle; intermittently pause the processing cycle in response to approaching a local region of the workpiece containing a defect indicator; complete a local scan cycle and/or a local repair cycle over this local region of the workpiece; resume the processing cycle after completing this local scan cycle and/or local repair cycle; and repeat the process for each other defect indicator detected on the workpiece.

12. Defect Confirmation

Block S164 of the method S100 recites, based on the second set of images, characterizing the first defect indicator as a first defect reparable via material removal from the workpiece. Generally, in Block S164, the system can verify presence of a defect, identify a type of the defect, characterize a severity of the defect, and/or select a repair mode for the defect based on higher-resolution two- and/or three-dimensional data captured by the system during a local scan cycle, as shown in FIG. 2.

In particular, in Block S164, the system can implement template matching, object recognition, and/or other computer vision or artificial intelligence techniques to validate and characterize a defect indicator based on higher-resolution two- and/or three-dimensional data—of a region of the workpiece containing the defect individual—captured by the system in Block S162.

12.1 Defect Type

In one implementation shown in FIG. 2, the system can: implement computer vision techniques to detect a two- or three-dimensional edge or discontinuity in two- or three-dimensional image data captured during a local scan cycle; extract a set of features around and representing this discontinuity from these two- or three-dimensional image data; and implement template matching techniques to identify this discontinuity as one of a scratch, a chip, a paint sag, a paint sag, a paint curtain, a paint bubble, pitting, orange peel, a rough edge, and dry spray.

For example, the system can: retrieve a set of photographic images captured by the system during a local scan cycle around a first detect indicator; and detect and extract a first set of features, from this set of higher-resolution photographic images, cospatial with the first defect indicator. The system can further retrieve a set of defect templates from a template database, wherein each defect template includes a photographic image or a set of image features depicting a representative defect and labeled with a known defect type, defect severity, and defect repair mode (e.g., inherent repair via material removal during processing cycle, repair via material removal during separate, manual repair). In this example, the system can then implement artificial intelligence techniques to calculate similarity between the first set of features—extracted from the higher-resolution photographic images—and each template image in the template database. The system can then select a first template image corresponding to a highest similarity (e.g., a first similarity score) to the first set of features. If this similarity (or first similarity score) exceeds a threshold score, the system can: retrieve a first defect type, a first defect severity, and/or a first defect repair mode associated with the first template image; and characterize the first defect indicator as a defect of the first defect type, of the first defect severity, and/or repairable via the first defect repair mode in Block S164.

In another implementation, the system can access a defect model: trained on a corpus of images depicting and labeled with known defect types, defect severities, defect repair modes, and/or repair cycle parameters (e.g., target force, repair toolpath pattern, repair toolpath stepover distance, material removal depth); configured to ingest an image region or a first set of features depicting a region of a workpiece depicting a defect indicator; and to return a confidence score for presence, type, severity, and/or repair mode for a defect. Accordingly, the system can: retrieve a set of photographic images captured by the system during a local scan cycle around a first defect indicator; detect and extract a first set of features, from this set of higher-resolution photographic images, cospatial with the first defect indicator; and insert the first set of features (or a segment of these photographic images depicting the first defect indicator) into the defect model. Then, if the model returns a confidence score for presence of a defect greater than a threshold score, the system can: confirm presence of a defect in this region of the workpiece; and label this defect with a type, severity, repair mode, and/or repair cycle parameters returned by the model.

The system can repeat the foregoing process for each defect indicator detected in Block S160 and re-scanned in Block S162. However, the system can implement any other method or technique to confirm presence of and/or characterize a defect in Block S164.

12.2 Defect Repair Mode+Parameters

As shown in FIG. 2, the system can then characterize or identify each defect as: repairable via material removal by the system during a nominal processing cycle (e.g., for light scratches, orange peel); repairable via material removal by the system during a separate repair cycle (e.g., for heavier scratches, paint sags, paint runs); or not repairable by the system (e.g., cracks, voids, flaking paint, paint curtains, dry paint, incomplete paint application).

More specifically, a first subset of defect types and severities may be repairable via nominal processing parameters during the processing cycle without a separate repair cycle, such as light scratches and orange peel. A second subset of defect types and severities may be repairable via modified processing parameters during the processing cycle without a separate repair cycle, such as moderate scratches and heavier orange peel repaired via higher target forces, slower feed rates, and/or narrower stepover distances in the segments of the nominal toolpath intersecting these defects. A third subset of defect types and severities may be repairable via a separate repair cycle, such as heavy scratches, paint runs, paint sags, and light gouges. A fourth subset of defect types and severities may not be repairable via material removal by the system or may otherwise require manual repair, such as paint curtains, heavy gouges, cracks, and voids. The system can therefore classify types and severities of defects detected in Blocks S160 and S164 and assign repair modes for these defects accordingly.

For example, a paint curtain (e.g., an area of multiple contiguous and adjacent paint runs or sags) may contain subsurface paint that is not cured. Autonomous processing of the paint curtain by the system may spoil a sanding disk on the sanding head, tear paint from the workpiece, and/or render a void or other surface discontinuity at the location of the paint curtain. Therefore, the system can: flag a paint curtain detected on the workpiece for manual repair; generate a notification including a prompt for repair, a type of the defect, and a location of the defect on the workpiece; and serve this notification to an operator.

12.2.1 Defect Repair Mode+Repair Parameters by Defect Model

In one implementation described above and shown in FIGS. 2 and 4, the system: retrieves a defect model trained on images of defects labeled with defect type, defect severity, repair mode, and/or repair cycle parameters; inserts image regions and/or image features representing a defect indicator into the defect model; and tags the defect indicator with a defect type, defect severity, repair mode, and/or repair cycle parameters returned by the defect model.

12.2.2 Defect Repair Mode and Output by Lookup Table or Model

In another implementation, the system: implements computer vision and/or artificial intelligence techniques to classify a type and severity of a defect as described above; retrieves a stored lookup table or repair model defining associations between defect types, defect severities, repair modes, and/or repair cycle parameters; and then selects a repair mode and/or repair cycle parameters specified in the lookup table or repair model for the type and severity of the defect.

12.2.3 Defect Repair Mode+Parameters by Defect Severity

In yet another implementation, the system implements methods and techniques described above to classify a type of a defect. The system then characterizes a severity of the defect based on two- and/or three-dimensional features of the defect extracted from images captured during the corresponding local scan cycle. For example, the system can: retrieve a depth map captured during the local scan cycle and depicting a workpiece region containing the defect indicator (or the confirmed defect); detect or calculate a nominal surface of the workpiece region, such as by calculating a smoothed surface through three-dimensional points in the depth map; detect a defect surface (e.g., a cluster of points) cospatial with the defect indicator in the depth map; calculate an offset distance between the defect surface and the nominal surface; and calculate a severity score for the defect proportional to this offset distance. (In this example, the system can also identify this defect as a scratch or gouge if the defect surface is located below the nominal surface and identify this defect as a paint sag, run, or bubble if the defect surface is located above the nominal surface.) Additionally or alternatively, the system can: extract a maximum length or surface area of the defect from the data packet and/or from a photographic image of the workpiece region; and calculate a severity score for the defect proportional to this maximum length or surface area.

Therefore, the system can: calculate a high severity score for a deep gouge and for a wide paint curtain, which may not be repairable by the system; calculate a moderate severity score for a small chip, long narrow scratch, or large area of orange peel, which may be repairable via separate repair cycles; or calculate a low severity score for light scratches or small areas of orange peel, which may be repairable during a nominal or modified processing cycle.

For example, in response to the severity score of the defect falling below a target severity score range, the system can: withhold or discard a separate repair toolpath for the defect; instead predict repair of the defect via the nominal toolpath generated for the workpiece; and generate the nominal toolpath that spans the workpiece region containing this defect. Alternatively, in response to the severity score of the defect falling within the target severity score range, the system can: schedule a separate repair cycle; generate a repair toolpath and define repair parameters for the defect; and execute the repair cycle before or during the nominal toolpath to repair the defect. Yet alternatively, in response to the severity score of the defect exceeding the target severity score range, the system can: withhold or discard a repair toolpath for the defect; flag the defect for manual repair; and generate the nominal toolpath that avoids the workpiece region containing this defect.

13. Repair Cycle Parameters

As described above and shown in FIG. 2, the system can implement a defect model and artificial intelligence techniques to identify a type, severity, and repair mode of the defect and to directly select repair cycle parameters (e.g., including a repair toolpath pattern, a target repair force, and a repair cycle feed rate) for repairing the defect. Alternatively, as described above, the system can read predefined repair mode and repair cycle parameters from a lookup table or other repair model based on characteristics of the defect.

Yet alternatively, the system can: calculate a material removal depth to repair a defect based on a severity and/or other characteristics of the defect; and then implement methods and techniques described above to generate a repair toolpath, calculate a target repair force, and calculate a repair cycle feed rate based on this material removal depth and characteristics of the workpiece.

In one implementation, in response to the severity score of the defect exceeding a maximum severity score, the system can flag the defect for manual repair. However, in response to the severity score of the defect falling below the maximum severity score, the system can: flag the defect for autonomous repair; implement methods and techniques described above to calculate an offset distance between the defect and a nominal surface of the workpiece adjacent the defect; and calculate a material removal depth to repair the defect based on (e.g., proportional) this offset distance.

In one example, the system is configured to: autonomously navigate the sanding head over a region of the workpiece containing a defect during a repair cycle to remove material on or around the defect; and then autonomously navigate the sanding head over the entire workpiece during a processing cycle to remove material from the entire workpiece, thereby blending material removal between defective and non-defective regions of the workpiece. In this example, the system can: implement methods and techniques described above to calculate a nominal material removal depth from the workpiece based on the output surface quality selected for the workpiece by the operator; and subtract this nominal material removal depth from the depth of the defect to calculate a target repair removal depth.

In another example, the system is configured to: autonomously navigate the sanding head over a region of the workpiece containing a defect during a repair cycle to remove material on and around the defect to repair and finish this region of the workpiece; and separately autonomously navigate the sanding head over the workpiece outside of the defective region(s) during a processing cycle to remove material from the remainder of the workpiece. In this example, the system can: implement methods and techniques described above to calculate a nominal material removal depth from the workpiece based on the output surface quality selected for the workpiece by the operator; and add this nominal material removal depth to the depth of the defect to calculate a target repair removal depth.

Additionally or alternatively, in the foregoing examples, the system can set the target repair removal depth equal to: 80% of the depth of the defect in order to prevent excess material removal from the workpiece (e.g., for defects below the nominal surface of the workpiece, such as scratches, chips, or gouges); 100% of the depth of the defect (e.g., for 2.5D defects, such as orange peel; for low- and moderate-defects above the nominal surface of the workpiece); or 120% of the depth of the defect (e.g., for heavy paint sags or runs).

The system can then implement methods and techniques described above to set parameters for the repair cycle based on this target repair removal depth. More specifically, the system can: retrieve a function that relates contact duration (i.e., a time or rotation count of a sanding disk in contact with a workpiece), applied force (or pressure), sanding disc grit, and material removal depth; and calculates a repair contact duration for the defect based on a nominal target force selected for the workpiece (or other target repair force set for the defect), the sanding disc grit selected for the workpiece, and the target repair removal depth. The system then sets or calculates a combination of pitch offset between legs of a repair toolpath (or "repair stepover distance") and a repair feed rate for the repair toolpath that yields the repair contact duration. For example, the system can set a repair feed rate and a repair stepover distance—inversely proportional to feed rate—based on feed rate preferences set by the operator. Alternatively, the system can: set a lower repair feed rate and wider repair stepover distance for segments of a repair toolpath within a region of the workpiece characterized by a large radius in which a large proportion of the sanding disk is in contact with the workpiece; and set a higher repair feed rate and narrower repair stepover distance for segments of a repair toolpath intersecting a region of the workpiece characterized by a small radius in which a smaller proportion of the sanding disk is in contact with the workpiece.

In one variation, the system can set a dynamic feed rate for a repair cycle of a defect in order to achieve greater material removal specifically over the defect and less material removal in adjacent regions of the workpiece. For example, the system can specify a slowest feed rate directly over the defect and a feed rate that increases (e.g., linearly) the distance of the sanding head from the defect (e.g., from a centroid of the defect, from a point on the defect characterize by greatest offset from an adjacent nominal surface of the workpiece). Therefore, during a repair cycle for this defect, the system can: navigate the sanding head along the repair toolpath for the defect: at a minimum repair feed rates in segments of the repair toolpath that fall directly over the defect in order to achieve maximum material removal directly over the defect; and at greater repair feed rates in segments of the repair toolpath that are laterally offset from the defect in order to achieve both minimum material removal at greater distances from the defect and smoothing surface finish blending around the defect.

The system can therefore set or retrieve a target repair force, a repair stepover distance, and a repair feed rate for the defect.

In the foregoing implementation, the system can also assign a target repair force—to the defect—that differs from the nominal target force set for the workpiece. For example, the system can: assign a repair force equal to the nominal force for the workpiece to a defect that extends below the nominal surface of the workpiece; and assign a repair force greater than the nominal force for the workpiece to a defect that extends above the nominal surface of the workpiece, such as 1% greater than the nominal force per 0.1 millimeter that the defect extends above the nominal surface of the workpiece.

Therefore, the system can: calculate a target repair force—greater than the nominal target force—for the defect; assign this target repair force to a repair toolpath generated by the system to repair the defect (or to a region of the nominal toolpath extending over the defect); and thus achieve faster material removal from the workpiece around the defect than a nominal surface on the workpiece. Similarly, the system can calculate a repair feed rate—less than a nominal feed rate—for the defect; assign this repair feed rate to the repair toolpath generated by the system to repair the defect (or to a region of the nominal toolpath extending over the defect); and thus achieve greater material removal from the workpiece around the defect than the nominal surface on the workpiece.

However, the system can implement any other method or technique to define repair material removal depth, repair force, repair first device, and/or repair stepover distance, etc. to the defect.

14. Repair Toolpath Generation

The system then generates a repair toolpath for the region of the workpiece containing the defect. In one implementation, the system: defines a serpentine or boustrophedonic toolpath within this region of the workpiece according to the repair stepover distance set for this workpiece region; and stores this repair toolpath as a set of keypoints, wherein each keypoint represents a vertex or other point on the toolpath, defines a three-dimensional position on the workpiece, includes a vector normal to the workpiece at this three-dimensional position, and is labeled with the target repair force and the repair feed rate set for the defect, as shown in FIG. 2.

In one example in which the system is configured to execute separate repair and processing cycles over regions of the workpiece with limited overlap, the system: characterizes a defect indicator—detected in Block S160—as a scratch repairable via material removal from the workpiece in Block S164 based on image data captured in Block S162; and then generates a repair toolpath defining a boustrophedonic geometry—contained within the corresponding workpiece region and characterized by the repair stepover distance selected for the defect—in Block S166; and assigns a target repair force to the repair toolpath to achieve a target repair removal depth from the workpiece region around the defect. Furthermore, in this example, the system generates a nominal toolpath defining a boustrophedonic geometry contained within a second region of the workpiece—outside of the defect—and characterized by a nominal stepover distance greater than the repair stepover distances; and assigns the nominal target force, similar to (or "approximating") or less than the repair force, to the nominal toolpath to achieve a nominal material removal depth, greater than target repair removal depth, from the second workpiece region.

In another example in which the system is configured to execute a repair cycle over a region of the workpiece containing a defect and before or while executing a processing cycle over the entire workpiece, the system can implement similar methods and techniques: to generate a nominal toolpath (e.g., defining a boustrophedonic geometry) over the entire workpiece, as described above; and to generate a repair toolpath (e.g., defining a similar boustrophedonic geometry with narrower stepover distance) over the region of the workpiece containing the defect.

15. Multiple Defects

The system can therefore: detect a defect indicator in data captured during the global scan cycle; execute a local scan cycle to capture higher-resolution data depicting the defect indicator in a local scan cycle; verify presence of a defect and derive characteristics of the defect from these higher-resolution scan data; define repair parameters (e.g., repair force, repair stepover distance, repair feed rate, target repair removal depth) based on these characteristics of the defect; and generate a repair toolpath for the defect based on these repair parameters and a local geometry (or "contour") of the workpiece represented in the virtual model.

The system can also repeat this process to generate repair parameters and repair toolpaths for other defects on the workpiece, as shown in FIGS. 1 and 2,

16. Repair Cycle

Block S152 of the method S100 recites, during a repair cycle, via a set of actuators coupled to the end effector, navigating a sanding head across the first workpiece region according to the repair toolpath in Block S152. Generally, in Block S152, the system can execute methods and techniques described above to: autonomously navigate the sanding head across a region of the workpiece—containing a defect—according to a corresponding repair toolpath; track forces applied by the sanding head to the workpiece; and implement closed-loop controls to maintain this applied force at a target repair force assigned to the repair toolpath by deviating the sanding head from the repair toolpath along vectors normal to the workpiece, as shown in FIGS. 2 and 3.

16.1 Local Scan+Repair Before Nominal Processing

In one implementation, the system: executes the global scan cycle; detects a set of defect indicators in data captured during the global scan cycle; executes a local scan cycle around each defect indicator; verifies defects in these locations based on higher-resolution scan data captured during these local scan cycles; generates repair parameters and a repair toolpath for each defect identified as repairable via material by the system; and generates nominal parameters and a nominal toolpath for the entire workpiece.

In this implementation, the system can also define an order for repair cycles for the defects, such as: in order from shortest distance to greatest distance of corresponding defects to the origin of the system; and according to an order than yields a minimum traversal distance by the system to complete these repair cycles. The system then: autonomously executes a repair cycle for each of these defects, including navigating the sanding head over each defect according to its corresponding repair toolpath; and then executes the processing cycle, including navigating the sanding head over the entire workpiece (i.e., for repair cycles that repair defects to the nominal surface condition of the workpiece before processing) or over regions of the workpiece not processed during the preceding repair cycles (i.e., for repair cycles that repair defects to the target output surface quality specified for the workpiece).

16.2 Local Scan Before Interleaved Repair+Nominal Processing

In another implementation, the system: executes the global scan cycle; detects a set of defect indicators in data captured during the global scan cycle; executes a local scan cycle around each defect indicator; verifies defects in these locations based on higher-resolution scan data captured during these local scan cycles; generates repair parameters and a repair toolpath for each defect identified as repairable via material by the system; and generates nominal parameters and a nominal toolpath for the entire workpiece.

The system then initiates the processing cycle according to these nominal processing parameters and the nominal toolpath. Upon approaching a location of a verified defect with assigned repair parameters and repair toolpath, the system: pauses the processing cycle; executes a repair cycle around the defect according to its assigned repair parameters and repair toolpath; and then resumes the processing cycle upon completing the repair cycle.

16.3 Nominal Processing with Interleaved Local Scan and Repair

In another implementation, the system: executes the global scan cycle; detects a set of defect indicators in data captured during the global scan cycle; compiles these global scan data into a virtual model of the workpiece; generates nominal processing parameters and the nominal toolpath spanning the entire workpiece based on a geometry of the workpiece represented in the virtual model; and initiates the processing cycle according to these nominal processing parameters and the nominal toolpath.

In this implementation, upon approaching a location of a defect indicator while executing the processing cycle, the system: pauses the processing cycle; executes a local scan cycle around the defect indicator; verifies presence and characteristics of the defect based on higher-resolution scan data captured during this local scan cycle; generates repair parameters and a repair toolpath for the defect; executes a repair cycle over the defect according to these repair parameters and the repair toolpath; and then resumes the processing cycle upon completing the repair cycle (or upon verifying absence of a defect in this location based on higher-resolution scan data captured during the local repair cycle).

For example, the system can: access a first set of images—characterized by a first resolution—captured by the end effector while traversing the global scan path over the workpiece during the global scan cycle in Block S110; compile the set of images into a virtual model of the workpiece in Block S120; detect a first defect indicator in a first workpiece region of the workpiece based on the first set of images in Block S160; generate a nominal toolpath for the entire workpiece based on a geometry of the workpiece represented in the virtual model in Block S140; and assign a nominal target force to the nominal toolpath in Block S142. Then, during a processing cycle, the system can: access a sequence of force values output by a force sensor coupled to the sanding head in Block S150; navigate the sanding head, coupled to the end effector, across the workpiece according to the nominal toolpath in Block S152; and deviate the sanding head from the nominal toolpath to maintain forces of the sanding head on the workpiece proximal the nominal target force, based on the sequence of force values, in Block S154. Then, in response to the sanding head approaching the first workpiece region containing the first defect indicator, the system can: pause navigation of the sanding head along the nominal toolpath; and navigate the end effector over the first workpiece region to capture a second set of (higher-resolution) images of the first workpiece region during a local scan cycle in Block S162. The system can then: characterize the first defect indicator as a first defect repairable via material removal from the workpiece based on the second set of images in Block S164; generate a repair toolpath for the first defect based on the geometry of the workpiece represented in the virtual model in Block S166; and navigate the sanding head across the first workpiece region according to the repair toolpath to repair the defect down to a nominal-preprocessing condition in Block S152. In response to the sanding head completing the repair toolpath, the system then resumes navigation of the sanding head along the nominal toolpath—including over the first workpiece region containing the repaired defect—in Block S152.

In another example, the system can: access a first set of images—characterized by a first resolution—captured by the end effector while traversing the global scan path over the workpiece during the global scan cycle in Block S110; compile the set of images into a virtual model of the workpiece in Block S120; detect a first defect indicator in a first workpiece region of the workpiece based on the first set of images in Block S160; generate a nominal toolpath for the entire workpiece based on a geometry of the workpiece represented in the virtual model in Block S140; assign a nominal target force to the nominal toolpath in Block S142; and initiate and execute a processing cycle according to the nominal toolpath and the nominal target force in Blocks S152 and S154. Then, in response to the sanding head approaching the first workpiece region containing the first defect indicator, the system can: pause navigation of the sanding head along the nominal toolpath; and navigate the end effector over the first workpiece region to capture a second set of (higher-resolution) images of the first workpiece region during a local scan cycle in Block S162. The system can then: characterize the first defect indicator as a first defect reparable via material removal from the workpiece based on the second set of images in Block S164; define repair parameters for the defect; and revise the nominal toolpath and the nominal target force proximal the defect for repair of the defect, blending the repair with the first workpiece region, and finishing the first workpiece region to the target output surface quality selected for the workpiece. For example, the system can: define a material removal depth gradient for the workpiece based on a target material removal depth set for the workpiece and a target repair removal depth set for the defect; define nominal processing parameter (e.g., nominal target force, nominal stepover distance, nominal feed rate) gradients according to the material removal depth gradient; and adjust the nominal toolpath to achieve this material removal depth gradient. The system can then resume the nominal toolpath and nominal parameters—now revised according to the confirmed defect—to repair the defect, finish the first workpiece region to the target output surface quality, and process remaining regions of the workpiece. The system can repeat this in response to approaching each additional defect indicator detected in Block S160.

17. Notification: Manual Defect Repair

As described above and shown in FIG. 2, in response to verifying presence of a defect and characterizing the defect as either not repairable via material removal (e.g., a crack, a void) or too severe for autonomous repair by the system (e.g., a paint curtain), the system can: generate a notification to manually repair the defect; populate the notification with characteristics of the defect (e.g., defect type, location on the workpiece, severity, photographic images of the defect); and serve the notification to the operator. The system can also: annotate the virtual model to indicate the location of the defect; and present this annotated virtual model to the operator, such as by rendering the annotated virtual model on a display adjacent the system.

In this implementation, the system can also revise the nominal toolpath to avoid the workpiece region containing this defect.

18. Repair Record

In a similar implementation shown in FIG. 2, the system can generate a record of verified defects, characteristics of these defects (defect types, locations on the workpiece, severities, photographic images of defects), and actions executed by the system to repair these detects (e.g., target and actual repair parameters, target and actual repair toolpaths).

For example, the system can annotate the virtual model with a type and location of a defect verified in Block S164, repair parameters and repair toolpaths defined in Block S166, and actual force and sanding head path executed by the system in Block S152 to repair the defect. The system can repeat this process for each verified defect and store this annotated virtual model as a record of defect repairs completed on the workpiece by the system.

However, the system can implement any other method or technique to record characteristics of defect repairs autonomously executed by the system when processing the workpiece.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    accessing a virtual model of a workpiece;
    accessing a nominal toolpath for the workpiece;
    accessing a nominal target force assigned to the nominal toolpath;
    accessing a first set of images depicting the workpiece;
    based on the first set of images, detecting a first defect in a first workpiece region of the workpiece;
    in response to characterizing the first defect as repairable via material removal from the workpiece, generating a repair toolpath for the first workpiece region based on a first geometry of the first workpiece region represented in the virtual model;
    during a repair cycle, via a set of actuators coupled to a sanding head, navigating the sanding head across the first workpiece region according to the repair toolpath; and
    during a processing cycle:
        accessing a first sequence of force values output by a force sensor coupled to the sanding head; and
        via the set of actuators:
            navigating the sanding head across the workpiece according to the nominal toolpath; and
            based on the first sequence of force values, deviating the sanding head from the nominal toolpath to maintain forces, applied by the sanding head to the workpiece, proximal the nominal target force.

2. The method of claim 1, further comprising:
    based on the first defect, assigning a target repair force, greater than the nominal target force, to the repair toolpath; and
    during the repair cycle:
        accessing a second sequence of force values output by the force sensor; and
        via the set of actuators:
            based on the second sequence of force values, deviating the sanding head from the repair toolpath to maintain forces, applied by the sanding head to the workpiece, proximal the target repair force.

3. The method of claim 2:
    wherein navigating the sanding head across the first workpiece region according to the repair toolpath during the repair cycle comprises navigating the sanding head across the first workpiece region according to the repair toolpath during a first time period; and
    wherein navigating the sanding head across the workpiece according to the nominal toolpath during the processing cycle comprises navigating the sanding head across the workpiece according to the nominal toolpath during a second time period succeeding the first time period.

4. The method of claim 1:
    wherein navigating the sanding head across the workpiece during the processing cycle comprises:
        navigating the sanding head within a second workpiece region of the workpiece and toward the first workpiece region according to the nominal toolpath during a first time period; and
    wherein accessing the first set of images comprises:
        in response to the sanding head reaching the first workpiece region during the first time period:
            pausing the processing cycle; and
            navigating an end effector, supporting the sanding head and an optical sensor, over the first workpiece region to capture the first set of images via the optical sensor; and
    further comprising:
        in response to pausing the processing cycle:
            initiating the repair cycle within the first workpiece region during a second time period succeeding the first time period; and
        in response to completion of the repair cycle within the first workpiece region during the second time period:
            resuming the processing cycle during a third time period succeeding the second time period.

5. The method of claim 1:
    wherein generating the repair toolpath comprises generating the repair toolpath defining a boustrophedonic geometry contained within the first workpiece region and spanning the first defect;
    wherein navigating the sanding head across the first workpiece region during the repair cycle comprises navigating the sanding head within the first workpiece region;
    wherein accessing the nominal toolpath for the workpiece comprises accessing the nominal toolpath for the workpiece spanning the first workpiece region and a second workpiece region of the workpiece; and
    wherein navigating the sanding head across the workpiece during the processing cycle comprises navigating the sanding head across the first workpiece region and the second workpiece region.

6. The method of claim 1:
    further comprising:
        accessing a nominal feed rate assigned to the nominal toolpath; and
        accessing a repair feed rate, less than nominal feed rate, specified for defects;
    wherein navigating the sanding head across the first workpiece region during the repair cycle comprises:
        navigating the sanding head along the repair toolpath at the nominal feed rate; and
        in response to the sanding head approaching the first defect, navigating the sanding head along the repair toolpath at the repair feed rate; and
    wherein navigating the sanding head across the workpiece during the processing cycle comprises navigating the sanding head across the workpiece at the nominal feed rate.

7. The method of claim 1:
    further comprising navigating an optical sensor over and offset from the workpiece during a global scan cycle;
    wherein accessing the first set of images depicting the workpiece comprises accessing the first set of images, characterized by a first resolution, captured by the optical sensor during the global scan cycle;

wherein accessing the virtual model of the workpiece comprises generating the virtual model of the workpiece based on the first set of images;
wherein accessing the nominal toolpath for the workpiece comprises generating the nominal toolpath based on a geometry of the workpiece represented in the virtual model; and
further comprising:
in response to detecting the first defect in the first workpiece region of the workpiece based on the first set of images, navigating the optical sensor over and offset from the first workpiece region of the workpiece during a local scan cycle;
accessing a second set of images, characterized by a second resolution greater than the first resolution, captured by the optical sensor during the local scan cycle; and
based on the second set of images, characterizing the first defect as repairable via material removal from the workpiece.

8. The method of claim 7:
further comprising:
based on the first set of images, detecting a second defect indicator in a second workpiece region of the workpiece;
in response to detecting the second defect in the second workpiece region of the workpiece, navigating the optical sensor over and offset from the second workpiece region of the workpiece during a second local scan cycle;
accessing a third set of images, characterized by the second resolution, captured by the optical sensor during the second local scan cycle; and
based on the third set of images, characterizing the second defect as irreparable via material removal from the workpiece; and
in response to characterizing the second defect as irreparable via material removal from the workpiece:
generating a notification to manually repair the second defect in the second workpiece region; and
serving the notification to an operator; and
wherein generating the nominal toolpath comprises generating the nominal toolpath excluding the second workpiece region.

9. The method of claim 7, further comprising, in response to characterizing the second defect as irreparable via material removal from the workpiece:
annotating the virtual model with a location of the second defect on the workpiece; and
rendering the virtual model on a display.

10. The method of claim 8:
wherein characterizing the first defect as repairable via material removal from the workpiece comprises:
extracting a first set of features from a first image, in the second set of images, depicting the first workpiece region of the workpiece; and
characterizing the first defect as a paint sag based on the first set of features; and
wherein characterizing the second defect as irreparable via material removal from the workpiece comprises:
extracting a second set of features from a second image, in the third set of images, depicting the second workpiece region of the workpiece; and
characterizing the second defect as a gouge based on the second set of features.

11. The method of claim 1:
wherein accessing the first set of images comprises accessing the first set of images comprising depth maps captured by a depth sensor navigated over the workpiece; and
wherein detecting the first defect comprises detecting the first defect based on a three-dimensional surface discontinuity, present in the first workpiece region of the workpiece, based on the first set of images.

12. The method of claim 1:
wherein accessing the first set of images comprises accessing the first set of images comprising photographic images captured by a color camera sensor navigated over the workpiece; and
wherein detecting the first defect comprises detecting the first defect based on a two-dimensional color discontinuity detected in a first photographic image, in the first set of images, depicting the first workpiece region of the workpiece.

13. The method of claim 1, further comprising:
characterizing the first defect indicator as the first defect of a first defect type based on features detected in the second set of images;
annotating the virtual model with:
the first defect type at a location of the first defect; and
characteristics of the repair toolpath;
further comprising navigating an optical sensor over and offset from the workpiece during a scan cycle;
wherein accessing the first set of images depicting the workpiece comprises accessing the first set of images comprising photographic images captured by the optical sensor during the global scan cycle;
wherein detecting the first defect in the first workpiece region of the workpiece based on the first set of images comprises:
extracting a first set of features depicting the first workpiece region of the workpiece from the first set of images;
detecting the first defect based on the first set of features;
characterizing a first size of the first defect based on the first set of features; and
characterizing a first severity of the first defect proportional to the first size;
further comprising:
extracting a second set of features depicting a second workpiece region of the workpiece from the first set of images;
detecting a second defect in the second workpiece region of the workpiece based on the second set of features; and
characterizing a second size, less than the first size, of the second defect based on the second set of features; and
characterizing a second severity, less than the first severity, of the second defect proportional to the second size;
wherein generating the repair toolpath for the first workpiece region comprises generating the repair toolpath for the first workpiece region further in response to the first severity exceeding a threshold severity; and
wherein accessing the nominal toolpath for the workpiece comprises, in response to the second severity score falling below the threshold severity, generating the nominal toolpath, spanning the second workpiece region and a third workpiece region of the workpiece, based on a geometry of the workpiece represented in the virtual model.

14. A method comprising:
accessing a virtual model of a workpiece;
accessing a first image depicting a first workpiece region of the workpiece;
based on the first image, detecting a first defect in the first workpiece region of the workpiece;
in response to characterizing the first defect as repairable via material removal from the workpiece, generating a first toolpath for the first workpiece region based on a first geometry of the first workpiece region represented in the virtual model;
accessing a second toolpath for a second workpiece region of the workpiece;
accessing a nominal target force assigned to the workpiece;
during a repair cycle, via a set of actuators coupled to a sanding head, navigating the sanding head across the first workpiece region according to the first toolpath; and
during a processing cycle:
 accessing a sequence of force values output by a force sensor coupled to the sanding head; and
 via the set of actuators:
  navigating the sanding head across the second workpiece region of the workpiece according to the second toolpath; and
  based on the sequence of force values, deviating the sanding head from the second toolpath to maintain forces, applied by the sanding head to the second workpiece region of the workpiece, proximal the nominal target force.

15. The method of claim 14, further comprising:
based on the first defect, assigning a target repair force, greater than the nominal target force, to the repair toolpath; and
during the repair cycle:
 accessing a second sequence of force values output by the force sensor; and
 via the set of actuators:
  based on the second sequence of force values, deviating the sanding head from the repair toolpath to maintain forces, applied by the sanding head to the workpiece, proximal the target repair force.

16. The method of claim 14:
wherein navigating the sanding head across the second workpiece region during the processing cycle comprises:
 navigating the sanding head within the second workpiece region of the workpiece and toward the first workpiece region according to the nominal toolpath during a first time period;
wherein accessing the first set of images comprises:
 in response to the sanding head reaching the first workpiece region during the first time period:
  pausing the processing cycle; and
  navigating an end effector, supporting the sanding head and an optical sensor, over the first workpiece region to capture the first set of images via the optical sensor; and
further comprising:
 in response to pausing the processing cycle:
  initiating the repair cycle within the first workpiece region during a second time period succeeding the first time period; and
  in response to completion of the repair cycle within the first workpiece region during the second time period:
   resuming the processing cycle during a third time period succeeding the second time period.

17. The method of claim 14:
further comprising navigating an optical sensor over and offset from the workpiece during a global scan cycle;
wherein accessing the first set of images depicting the workpiece comprises accessing the first set of images, characterized by a first resolution, captured by the optical sensor during the global scan cycle;
wherein accessing the virtual model of the workpiece comprises generating the virtual model of the workpiece based on the first set of images;
wherein accessing the nominal toolpath for the workpiece comprises generating the nominal toolpath based on a geometry of the workpiece represented in the virtual model; and
further comprising:
 in response to detecting the first defect in the first workpiece region of the workpiece based on the first set of images, navigating the optical sensor over and offset from the first workpiece region of the workpiece during a local scan cycle;
 accessing a second set of images, characterized by a second resolution greater than the first resolution, captured by the optical sensor during the local scan cycle; and
 based on the second set of images, characterizing the first defect as repairable via material removal from the workpiece.

18. A method comprising:
accessing a virtual model of a workpiece;
accessing a first image depicting a first workpiece region of the workpiece;
based on the first image, detecting a first defect in the first workpiece region of the workpiece;
in response to characterizing the first defect as repairable via material removal from the workpiece:
 generating a first toolpath for the first workpiece region based on a first geometry of the first workpiece region represented in the virtual model; and
 assigning a target repair force to the first toolpath;
accessing a second toolpath for a second workpiece region of the workpiece; and
during a processing cycle:
 accessing a sequence of force values output by a force sensor coupled to a sanding head; and
 via a set of actuators coupled to the sanding head:
  navigating the sanding head across the first workpiece region of the workpiece according to the first toolpath; and
  based on the sequence of force values, deviating the sanding head from the first toolpath to maintain forces, applied by the sanding head to the first workpiece region of the workpiece, proximal the target repair force; and
 via the set of actuators, navigating the sanding head across the second workpiece region according to the second toolpath.

19. The method of claim 18:
further comprising navigating an optical sensor over and offset from the workpiece during a global scan cycle;
wherein accessing the first set of images depicting the workpiece comprises accessing the first set of images, characterized by a first resolution, captured by the optical sensor during the global scan cycle; and wherein accessing the virtual model of the workpiece comprises generating the virtual model of the workpiece based on the first set of images.

20. The method of claim 18, wherein accessing the sequence of force values comprises accessing the sequence of force values, output by the force sensor, representing forces applied by the sanding head to the workpiece parallel to an axis of rotation of the sanding head.

* * * * *